3,634,526
INHIBITION OF POPCORN POLYMER
FORMATION IN CHLOROPRENE
Edwin Benjamins, Montague, Mich., assignor to E. I. du
Pont de Nemours and Company, Wilmington, Del.
No Drawing. Filed Aug. 28, 1969, Ser. No. 853,926
Int. Cl. C07c 17/42
U.S. Cl. 260—652.5 P                                      1 Claim

ABSTRACT OF THE DISCLOSURE

Formation of popcorn polymer is chloroprene is inhibited by incorporating therein about from .002% to 0.5% by weight, based on the weight of chloroprene, of free, acid-form N-nitrosophenylhydroxylamine.

BACKGROUND OF THE INVENTION

In the manufacture of elastomeric polymers, and especially of such chlorobutadienes as 2-chloro-1,3-butadiene (chloroprene), unwanted granular polymers form during distillation and storage. These polymers, known as "popcorn" polymers because they resemble popped corn, are formed by the spontaneous polymerization of monomers in the system. So-called "seeds" are formed which act as sites for further polymerization, leading to a build-up of the "popcorn" polymer. Some of the seeds become attached to the process and handling equipment and cannot be readily removed by mechanical means; moreover, being insoluble in most common solvents, they are virtually impossible to wash out. Even after the equipment has been cleaned as thoroughly as possible, residual particles remain and promote the unwanted polymer growth. Popcorn polymerization causes loss of valuable raw material and significantly increases the overall cost of production by clogging pipes, condensers, and other equipment.

Various inhibitors for prevention of popcorn polymerization have been proposed. Gaseous nitrogen dioxide has been used in butadiene refining systems and has been found to stabilize chloroprene against popcorn growth, but unfortunately sometimes produces unstable, explosive products. Morrell U.S. Pat. 2,483,778 proposes the use of such compounds as tetra-methyl thiuram disulfide, sulfur dioxide, and N-cyclohexyl-2-benzothiazole-sulfinamide as inhibitors of popcorn polymerization in butadienes, but these compounds have been found either to have little or no value in preventing growth of the unwanted polymers in the chloro-1,3-butadiene systems or to interfere with the desired elastomer polymerization. In Cook U.S. Pat. 3,042,726, ammonium N - nitrosophenylhydroxylamine and homologues thereof are disclosed as popcorn inhibitors in chloroprene, and such compounds do in fact exhibit inhibiting action, but the degree of inhibition under conditions to which chloroprene is normally subjected during ordinary plant processing and storage is not as great as is desired, and it has not heretofore been evident how improved inhibition might be achieved.

SUMMARY OF THE INVENTION

Now according to the present invention it has been found that by incorporating into chloroprene about from .002% to 0.5% by weight of N-nitrosophenylhydroxylamine in the free, acid form, chloroprene compositions are obtained which are stable against popcorn polymerization to an unexpectedly high degree under conditions of normal processing and storage.

DESCRIPTION OF THE PREFERRED EMBODIMENTS

When an aqueous solution of the ammonium salt of N-nitrosophenylhydroxylamine is acidified with an acid such as hydrochloric, nitric, sulfuric or acetic, a white precipitate is formed. This precipitate can be filtered off and redissolved in dilute solutions of bases such as sodium, potassium and ammonium hydroxides. The precipitate, unlike the ammonium salt, is soluble in many organic solvents, such as benzene, toluene, chlorobutadiene, monovinylacetylene and petroleum ether. It appears that the following reaction takes place in the above-described acidification:

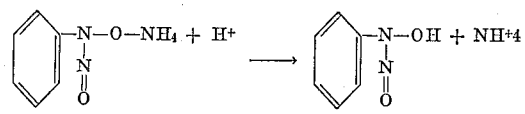

The free, acid-form product

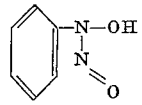

is considered to be the inhibitor of the present invention.

The stabilized compositions of the invention contain about from .002% to 0.5% by weight of the inhibitor based on the weight of the chloroprene. Less than this amount does not give the desired stability; more does not provide added inhibition in proportion to the cost and tends to complicate the polymerization of the chloroprene to desired polymers.

The presence of the desired concentration of inhibitor can be effected either by adding it directly, for instance as a solution in a solvent such as toluene, or by adding an aqueous solution of the ammonium salt to chlorobutadiene containing sufficient free hydrochloric acid to form the free hydroxylamine compound. In the latter method effective agitation is provided by passing the mixture through a centrifugal pump and finally the water phase can be decanted from the chlorobutadiene.

The inhibited chloroprene compositions of this invention have improved utility in that they can be processed stored under normal conditions with less tendency toward popcorn polymerization than has hitherto been encountered with other inhibition systems. On the other hand, they can be polymerized according to procedures with which the art is already familiar, such as described in Keller U.S. Pat. 2,914,497 for instance, to elastomeric products of excellent stability and homogeneity.

The invention will be better understood by reference to the following illustrative examples:

EXAMPLE 1

To provide a source of popcorn polymer, fifty milliliters of polymerization grade chloroprene was sealed in a steam-cleaned dry bottle along with a "seed" or grain of chloroprene popcorn polymer and set aside until the chloroprene was completely polymerized to popcorn polymer as determined by the disappearance of liquid chloroprene. This bottle of fresh "active" polymer was opened only after pressure bottles for inhibitor tests had been steamed for at least 15 minutes, purged with nitrogen, partly filled with 100 ml. of polymerization grade chloroprene and inhibitor added as specified in Table I. At that time 5.00 grams of chloroprene popcorn polymer was added to each bottle and the bottles capped and weighed.

The capped bottles were placed in a water bath at 40° C. for 17 hours to permit popcorn polymer to "grow." After opening the bottles, the unpolymerized chloroprene was poured off and the bottles weighed to determine the total amount of popcorn polymer. The ratio of popcorn polymer at the end of the test to the popcorn polymer added at the start of the test is given in Table I.

TABLE I

| Amount inhibitor based on chloroprene, p.p.m. | Inhibitor | Ratio [1] |
|---|---|---|
| 88 | Acid form of N-nitrosophenylhydroxylamine as 1% solution in toluene, obtained by extracting a solution of one gram of ammonium salt of nitrosophenylhydroxylamine in 5 ml. of 12 NHCl with 100 ml. of toluene. | 3.6 |
| None | None | 8.24 |

[1] Wt. of popcorn polymer at end of test to wt. of popcorn polymer added.

The inhibiting effect of the acid form of nitrosophenylhydroxylamine can most readily be compared with the ammonium salt as an inhibitor by adding HCl and NH₄OH to different bottles containing a chloroprene and a small amount of ammonium nitrosophenylhydroxylamine, the acid converting the nitrosophenylhydroxylamine (NPH) to the free-acid form.

As in Example 1, 100 ml. portions of chloroprene were placed in steamed, dry bottles. Fifty p.p.m. of ammonium nitrosophenylhydroxylamine was added, NH₄OH or HCl was added in amounts shown in Table II, 5.00 grams of fresh chloroprene popcorn polymer was added, the bottles were capped and heated for 17 hours at 40° C. and the amount of popcorn polymer growth was determined as in Example 1.

TABLE II

| Acid or base added based on chloroprene: | Ratio [1] |
|---|---|
| 0.28% NH₄OH | 7.9 |
| 0.28% NH₄OH | 7.7 |
| 0.01% HCl | 1.4 |
| 0.015% HCl | 1.8 |

[1] Wt. of popcorn polymer at end of test to wt. of popcorn polymer added.

From this example it can be seen that a more than fourfold increase in effectiveness is achieved by using the inhibitor in the acid form according to the present invention.

What is claimed is:

1. A composition comprising a polymerizable chloroprene stabilized against popcorn polymerization by having incorporated therein about from 0.002% to 0.5% by weight of free, acid-form N-nitrosophenylhydroxylamine, based on the weight of chloroprene.

References Cited

UNITED STATES PATENTS 3,042,726   7/1962   Cook _____ 260—652.5 P

HOWARD T. MARS, Primary Examiner